(12) United States Patent
Gottlieb et al.

(10) Patent No.: US 9,767,480 B1
(45) Date of Patent: *Sep. 19, 2017

(54) SYSTEMS AND METHODS FOR DISCOVERY AND TRACKING OF WEB-BASED ADVERTISEMENTS

(75) Inventors: Gabriel Gottlieb, Santa Monica, CA (US); Thomas George Lorimor, Seattle, WA (US)

(73) Assignee: PATHMATICS, INC., Santa Monica, CA (US)

( * ) Notice: Subject to any disclaimer, the term of this patent is extended or adjusted under 35 U.S.C. 154(b) by 1222 days.

This patent is subject to a terminal disclaimer.

(21) Appl. No.: 13/527,535

(22) Filed: Jun. 19, 2012

Related U.S. Application Data

(60) Provisional application No. 61/498,613, filed on Jun. 20, 2011.

(51) Int. Cl.
*G06Q 30/02* (2012.01)

(52) U.S. Cl.
CPC ..... *G06Q 30/0248* (2013.01); *G06Q 30/0246* (2013.01)

(58) Field of Classification Search
CPC ........................ G06Q 30/0207; G06Q 30/0251
USPC .............................................. 705/14.1–14.73
See application file for complete search history.

(56) References Cited

U.S. PATENT DOCUMENTS

| | | | |
|---|---|---|---|
| 8,050,970 B2 | 11/2011 | Barry et al. | |
| 8,239,263 B2 | 8/2012 | Axe et al. | |
| 8,386,314 B2 | 2/2013 | Kirkby et al. | |
| 8,392,241 B2 | 3/2013 | Coladonato et al. | |
| 8,554,602 B1 | 10/2013 | Zohar et al. | |
| 2004/0205049 A1 | 10/2004 | Aggarwal | |
| 2004/0225562 A1* | 11/2004 | Turner | G06Q 30/02 705/14.45 |
| 2005/0021397 A1 | 1/2005 | Cui et al. | |
| 2005/0222902 A1 | 10/2005 | Coit et al. | |
| 2008/0167957 A1* | 7/2008 | Steelberg | G06Q 30/02 705/14.64 |
| 2008/0215417 A1 | 9/2008 | Young | |
| 2009/0222316 A1 | 9/2009 | Boinepalli et al. | |

(Continued)

FOREIGN PATENT DOCUMENTS

EP 1662366 5/2006

*Primary Examiner* — Sam Refai
(74) *Attorney, Agent, or Firm* — McDermott Will & Emery LLP

(57) ABSTRACT

Systems and methods are provided for discovering advertisements on publisher web pages and for identifying placement pathways by which discovered advertisements have been placed on the publisher web pages. An advertisement tracking and discovery system may use multiple web crawler applications to explore multiple publisher websites. The web crawler applications may gather advertisement data that includes times associated with each request made by the web crawler application. The system may use the gathered advertisement data and the times associated with each request to determine the placement pathways by which discovered advertisements have been placed. Each placement pathway may include one or more advertising channels or combinations of advertising channels. The system may accumulate and aggregate advertising data associated with the advertisements and the placement pathways and display the aggregated advertising data to a customer.

16 Claims, 15 Drawing Sheets

(56) References Cited

U.S. PATENT DOCUMENTS

| | | |
|---|---|---|
| 2010/0241510 A1 | 9/2010 | Zhang |
| 2011/0072131 A1 | 3/2011 | Zohar et al. |
| 2011/0125587 A1* | 5/2011 | Netzer ................ G06Q 30/02 705/14.68 |
| 2011/0218866 A1 | 9/2011 | Wilson |
| 2013/0018723 A1 | 1/2013 | Khanna |

* cited by examiner

SYSTEMS AND METHODS FOR DISCOVERY AND TRACKING OF WEB-BASED ADVERTISEMENTS

This application claims the benefit of provisional patent application No. 61/498,613, filed Jun. 20, 2011, which is hereby incorporated by reference herein in its entirety.

BACKGROUND OF THE INVENTION

This invention relates generally to web-based information and, more specifically, to discovery and tracking of web-based advertisements.

Publisher websites such as newspaper web pages, television station web pages, web log web pages, magazine web pages, social networking web pages, microblogging web pages, and other internet-based online publishing sources often include advertisements for companies and products.

Advertisements on a publisher website may include images, videos, text, animations, or other visual or audio messages. These advertisements are sometimes referred to as advertisement creatives.

Each creative on a publisher webpage may be associated with a link such as an internet address that, when accessed, redirects a viewer of the publisher webpage to another webpage (sometimes referred to as a landing page) that is associated with the product, service, company, etc. that being advertised.

Advertisements may be placed on a publisher web page by a variety of sources. A company may purchase an advertisement block on the publisher web page directly from the publisher, through an advertising network, through an advertising exchange, through a demand side platform (DSP) or through some combination of these or other advertising channels.

Because of these various pathways in which an advertisement can be placed on a given publisher website, it can be difficult for publishers to keep track of which advertisers are advertising on their webpage and advertisers may find it difficult to keep track of which publishers are hosting their advertisements and by which advertising channel the advertisements are being placed. This can be problematic for advertisers that desire to efficiently reach a target audience or for publishers that desire to efficiently manage available advertising space.

Common advertisement tracking systems use internet exploring applications such as web crawlers to determine which publishers are hosting advertisements for a given advertiser and which advertisers are advertising on a given publisher website. However, these advertisement tracking systems are unable to determine which pathways (advertising channels) are being used to place a given advertisement on a given publisher webpage.

It would therefore be desirable to be able to provide improved systems for discovering and tracking internet based advertisements.

SUMMARY OF THE INVENTION

Systems and methods are provided for discovering and tracking advertisements on published internet web pages.

An advertisement tracking and discovery system may include advertisement discovery equipment, storage such as cloud-based storage, internet proxy servers, data analysis and storage equipment, and user-interface equipment for discovering advertisements on publisher web pages and for determining the pathway by which each advertisement has been placed on a publisher web page.

The advertisement discovery equipment may obtain a list of publisher websites (e.g., a list of universal resource locaters (URLs)) from the cloud-based storage and access each publisher website and each linked website or resource included in that website by sending out a Hypertext Transfer Protocol (HTTP) request to the URL of each publisher website and each linked website or resource. This process is sometimes referred to as spidering or crawling the publisher web pages.

The advertisement discovery equipment may access a publisher web page at a desired URL over a communications network. If desired, the advertisement discovery equipment may access the publisher web pages through a proxy server that is connected to the communications network.

The advertisement discovery equipment may gather and store HTTP request data associated with each HTTP request. The advertisement discovery equipment may accumulate a list of HTTP request data and process the list of HTTP request data to form processed advertisement data that includes tree data such as web site-specific tree data associated with placement pathways by which advertisements and other content were placed on a particular site.

The advertisement discovery equipment may use time information associated with each http request to determine the order in which the requests were made. The advertisement discovery equipment may use the time information in combination with other information such as redirect response headers and response body information in the HTTP request list to determine the pathways by which advertisements and other content were placed on a particular site.

The data analysis and storage equipment may receive and accumulate the processed advertisement data from computing equipment associated with various installations of advertisement discovery equipment in various geographic locations and combine the accumulated processed advertisement data to form user accessible aggregated advertisement data.

The data analysis and storage equipment may provide the aggregated advertisement data to the user-interface equipment for access by a customer. If desired, the data analysis and storage equipment may provide a portion of the aggregated data directly to the customer by generating an email containing some or all of the aggregated data. The data analysis and storage equipment and/or the user interface equipment may notify customers of updates periodically or in response to a detected change in one or more portions of the aggregated data.

Further features of the invention, its nature and various advantages will be more apparent from the accompanying drawings and the following detailed description of the preferred embodiments.

DETAILED DESCRIPTION

The present invention relates generally to systems and methods for identifying advertisements online and, more particularly, to systems for identifying how advertisements have been placed on publisher websites. Advertisements and pathways by which advertisements have been placed on publisher websites may be discovered using an advertisement tracking and discovery system.

The system may include advertisement discovery equipment and other computing equipment for gathering information related to page requests made by the advertisement discovery equipment while crawling a publisher web page and for extracting advertising channel information from the gathered information. The system may use data analysis and storage equipment or other computing equipment to process, aggregate and provide customer access to the advertising channel information.

Figure 1:
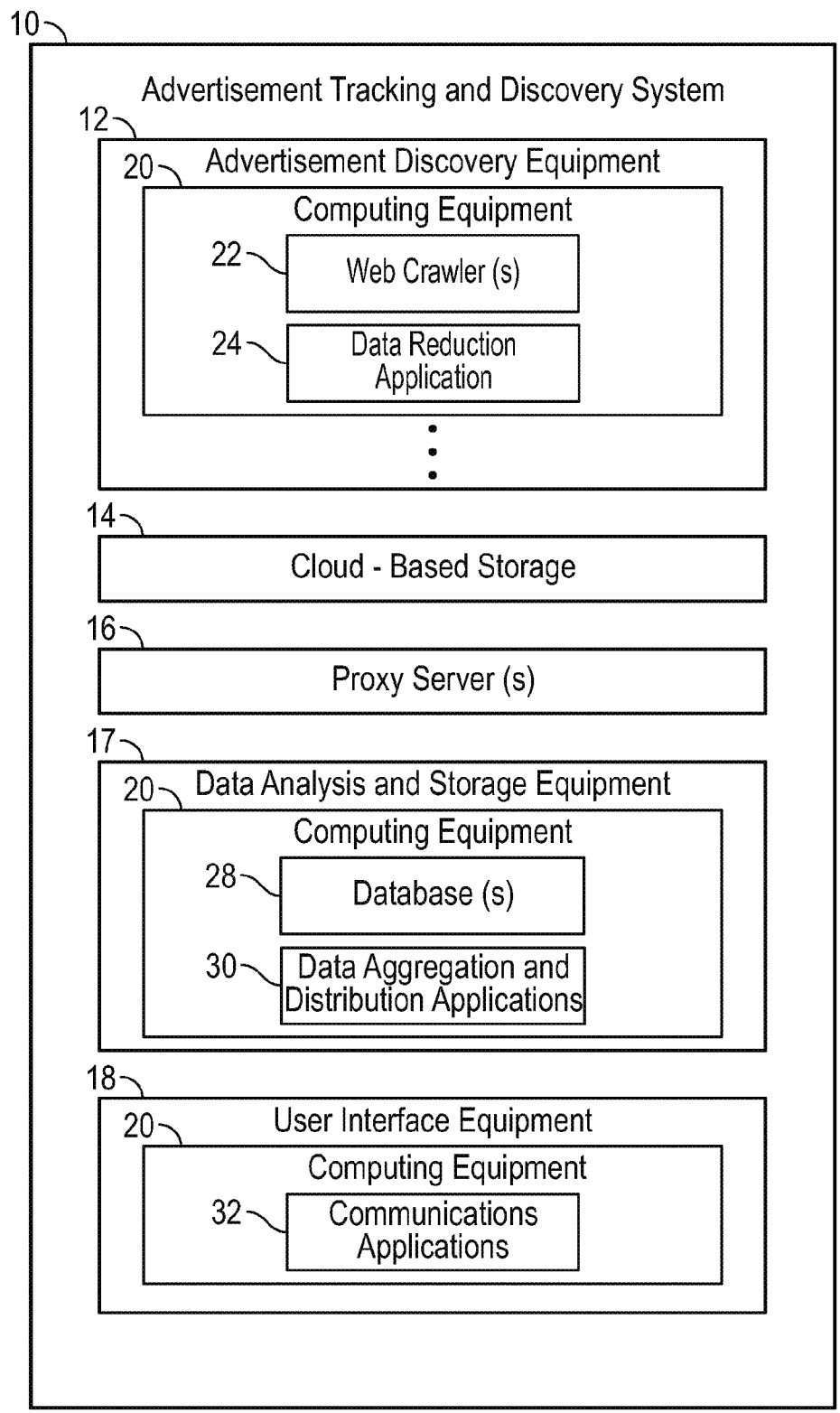
FIG. 1 is a diagram of an illustrative system for discovering and tracking web-based advertisements in accordance with an embodiment of the present invention.

An illustrative advertisement tracking and discovery system 10 is shown in FIG. 1. Advertisement tracking and discovery system 10 may include advertisement discovery equipment 12, one or more databases such as cloud-based storage 14, remote servers such as proxy servers 16, data analysis and storage equipment 17, user interface equipment 18 or other computing equipment.

Advertisement discovery equipment 12 may include computing equipment 20. Computing equipment 20 may include one or more personal computers, workstations, computers configured as servers, mainframe computers, portable computers, etc. Computing equipment 20 may include processing circuitry, displays, input-output devices, and storage (e.g., hard drives, volatile memory, non-volatile memory, and other storage media). Computing equipment 20 of advertisement discovery equipment 12 may be used to run code for software applications such as one or more web crawling applications 22 and data processing applications such as data reduction application 24. Data reduction application 24 may be used to process advertisement related data that has been gathered using web crawler(s) (e.g., modified web crawling web browsers or dedicated web crawling applications).

System 10 may include storage that is co-located with computing equipment 20 of system 10 and/or remote storage such as cloud-based storage 14. If desired, advertisement discovery equipment 12 and/or data analysis and storage equipment 17 may be used to access stored information from cloud-based storage 14 and/or provide information to cloud-based storage 14. Cloud-based storage 14 may include storage media such as hard drives, volatile memory, non-volatile memory, and other storage media associated with workstations, computers configured as servers, mainframe computers, portable computers, etc.

Data analysis and storage equipment 17 may include computing equipment 20. Computing equipment 20 of data analysis and storage equipment 17 may be co-located with computing equipment 20 of advertisement discovery equipment 12 or computing equipment 20 of data analysis and storage equipment 17 may be separate from computing equipment 20 of advertisement discovery equipment 12.

As examples, computing equipment 20 of data analysis and storage equipment 17 and computing equipment 20 of advertisement discovery equipment 12 may be implemented using a common computing platform, using separate computing platforms in a common room in a building, using separate computing platforms in separate rooms in a common building or using separate computing platforms in a common geographic location (e.g., a common city). However, this is merely illustrative. If desired, computing equipment 20 of advertisement discovery equipment 12 may include multiple computing platforms in multiple geographic locations that are separated from computing equipment 20 of data analysis and storage equipment 17. As examples, computing equipment 20 of advertisement discovery equipment 12 may include separate computing platforms in multiple cities that provide advertisement data to data analysis and storage equipment 17 that is located in an additional city.

Advertisement discovery equipment 12 may use web crawler(s) 22 to access and explore publisher web pages, gather advertisement related data from those publisher web pages, process the gathered data, and provide the processed data to data analysis and storage equipment 17. Data analysis and storage equipment 17 may be used to accumulate, aggregate, and store advertisement related data.

Computing equipment 20 of data analysis and storage equipment 17 may include storage such as one or more databases 28 and other computing equipment (e.g., one or more personal computers, workstations, computers configured as servers, mainframe computers, portable computers, processing circuitry, displays and input-output devices) that can be used to run code for software applications such as one or more data aggregation and distribution applications 30. Data aggregation and distribution applications 30 may be used to accumulate and aggregate data received from advertisement discovery equipment 12 and, if desired, to generate customer alert emails.

User interface equipment 18 may be used to provide a customer with access to advertisement related information such as aggregated advertisement data stored in data analysis and storage equipment 17. Computing equipment 20 of user interface equipment 18 may include one or more personal computers, workstations, computers configured as servers, mainframe computers, portable computers, etc.

Computing equipment 20 of user interface equipment 18 may include processing circuitry, displays, input-output devices, and storage (e.g., hard drives, volatile memory, non-volatile memory, and other storage media). Computing equipment 20 of user interface equipment 18 may form a portion of computing equipment 20 of data analysis and storage equipment 17 or may be formed separately from computing equipment 20 of data analysis and storage equipment 17.

Computing equipment 20 of user interface equipment 18 may be used to run code for software applications such as one or more communications applications 32. Communications applications 32 may be used to provide customers with access to advertisement related information such as aggregated advertisement data that is stored in data analysis and storage equipment 17.

Communications applications 32 may include a web portal for providing authenticated web access to portions of data stored in data analysis and storage equipment 17 (e.g., using a customer's web browser), a file-transfer-protocol application for providing bulk access to portions of data stored in data analysis and storage equipment 17, an Application Programming Interface (API), and/or an email generating application that generates and sends alert emails to customers (e.g., periodic alert emails or emails generated in response to a detected change in advertisement related information).

Figure 2:
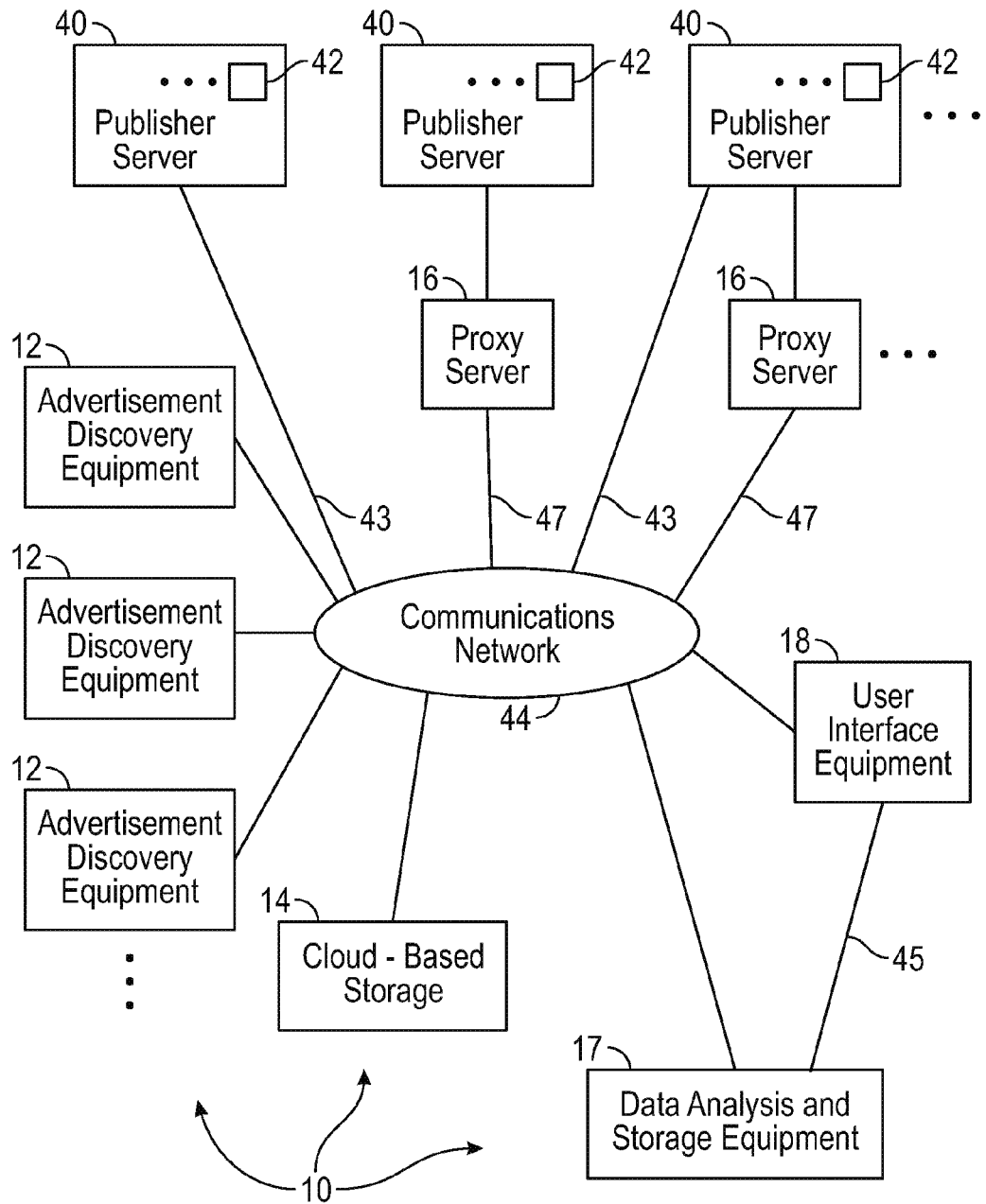
FIG. 2 is an illustrative diagram showing how portions of a system of the type shown in FIG. 1 may communicate with other portions of the system and with publisher servers over a communications network in accordance with an embodiment of the present invention.

FIG. 2 shows how portions of system 10 may communicate with other portions of system 10 and/or with publisher computing equipment such as publisher servers 40 over a communications network such as communications network 44. Communications network 44 may be a local area network, a wide area network such as the internet, or a combination of one or more local area networks and a wide area network.

As shown in FIG. 2, system 10 may include multiple implementations of advertising and discovery equipment 12 connected to one or more of multiple publisher servers 40 over network 44.

One or more web crawlers 22 running on each implementation of advertisement discovery equipment 12 may be used to access and explore one or more publisher web pages 42 that are hosted on publisher servers 40. If desired, web crawlers 22 running on computing equipment 20 of advertisement discovery equipment 12 in one geographic location (e.g., a country or a region of a country) may be used to access and explore publisher web pages in that geographic location. However, this is merely illustrative. If desired, web crawling applications 22 running on computing equipment 20 of advertisement discovery equipment 12 in one geographic location may access publisher servers 40 in another geographic location (e.g., another country or another region of a country) directly (as indicated by lines 43) or though a proxy server 16 (as indicated by lines 47) that is located in a common geographic location (e.g., a common country or region of a country) with those publisher servers 40.

During operation of system 10, advertisement discovery equipment 12 may obtain a list of universal resource locators (URLs) of publisher websites 42 to be explored from cloud-based storage 14. Web crawlers running on advertisement discovery equipment 12 may then access the websites associated with those obtained URLs and each linked web page, resource, or application associated with those URLs. However, this is merely illustrative. If desired, advertisement discovery equipment 12 may be used to generate the list of URLs to be explored. As examples, advertisement discovery equipment 12 may be provided with a single publisher URL and generate a list of related publisher URLs to be explored by crawling (spidering) the single publisher URL or advertisement discovery equipment 12 may access a publisher website associated with a URL that has been previously accessed and generate a list of related publisher URLs to be explored by re-crawling the previously accessed publisher URL.

Advertisement discovery equipment 12 may gather advertisement data associated with each URL and process the gathered data to identify advertisements associated with each URL and advertising channels responsible for placing those advertisements on the web page associated with that URL.

In some situations, advertisements such as advertiser-related images, videos, flash content, text links, or other advertisements are placed on a publishers web page by the publisher itself. In other situations, a publisher may sell advertising space to third party companies that sell that advertising space to advertisers and advertisements may be placed on the publisher web page by the third party company. Third party companies may include services such as advertising networks, advertising exchanges, demand side platforms (DSPs), yield optimizers, data platforms, and advertiser advertising servers.

Advertising discovery equipment 12 may identify advertisements associated with each URL and advertising channels responsible for placing those advertisements by recording each individual request made in the loading of the a publisher website. These requests may be for content of many forms (e.g., image content, text content, binary content, etc.) which may be used for many different purposes (e.g., information for a user, advertisements, data gathering, etc.).

Advertising discovery equipment 12 may process the recorded requests and responses associated with the requests and identify a cause and effect relationship between the one or more requests and/or one or more groups of requests. In the process of loading a website 42, one request may cause other requests to be made. For example, when a Hypertext Markup Language (HTML) page is loaded, it may include references to other HTML, Javascript, Adobe Flash®, or other resources to be loaded. In order to fully load the website, these referenced resources may also be loaded.

A cause and effect relationship may then be identified between the original HTML page that was loaded (in this example) and other referenced resources. These cause and effect relationships may be used to identify placement pathways by which content has been placed on a publisher website.

Advertising discovery equipment 12 may provide processed advertisement data to data analysis and storage equipment 17. Data analysis and storage equipment may, if desired, further process and store the received processed advertisement data. User interface equipment 18 may be used to provide customer access to the advertisement related data stored in data analysis and storage equipment 17. User interface equipment 18 may be connected to data analysis and storage equipment 17 through network 44 or through a direct connection (as indicated by line 45).

Figure 3:
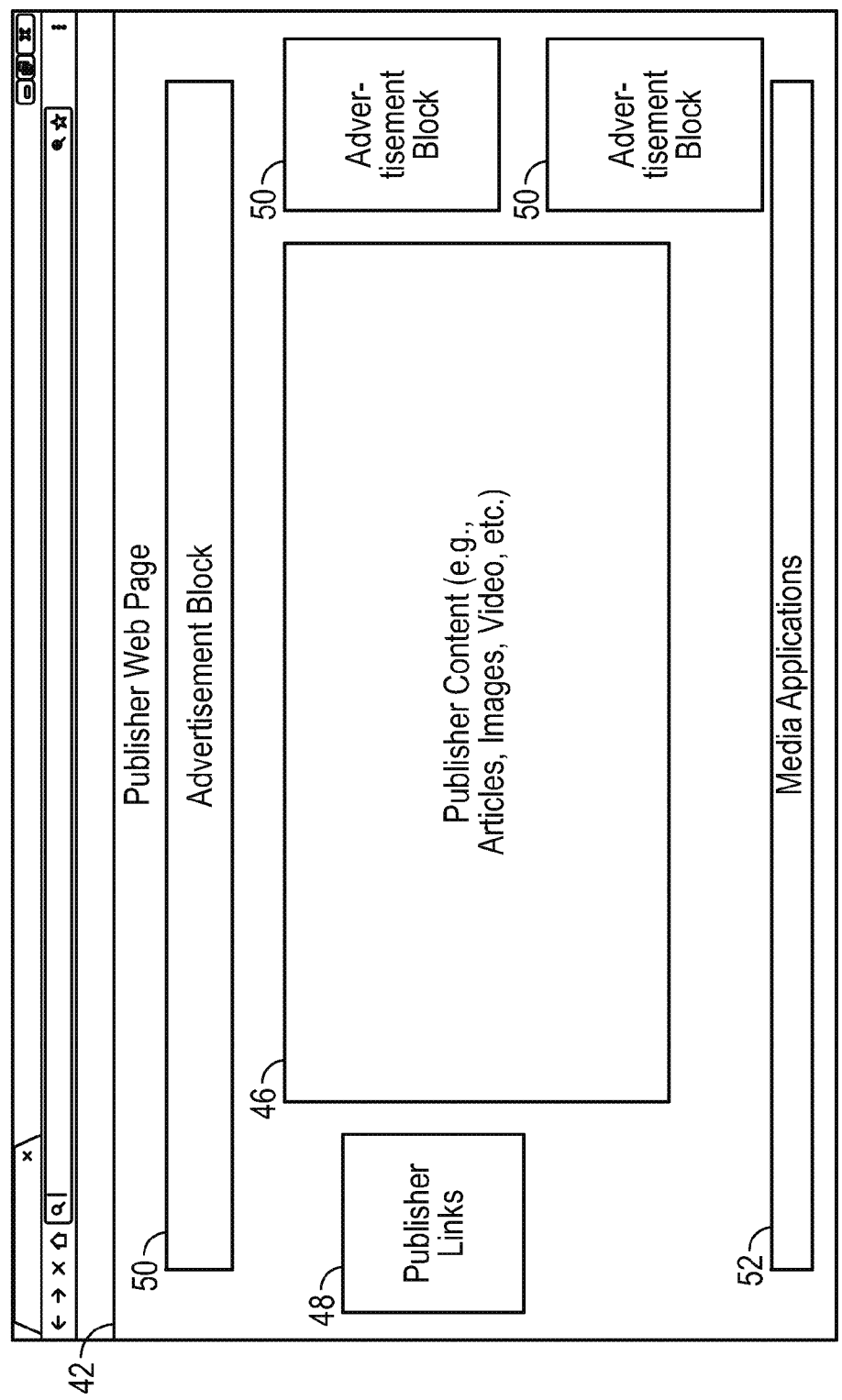
FIG. 3 is a diagram of a common publisher web page that can be hosted on a publisher server and that includes publisher content, media applications, publisher links, and one or more advertisement blocks.

FIG. 3 is a diagram of a typical publisher website such as one of web pages 42 of FIG. 2. As shown in FIG. 3, publisher web page 42 may include publisher content 46 (e.g., an article, a movie or an image), publisher links 48 (e.g., clickable links to other publisher web pages), media applications 52 (e.g., social networking applications) and one or more advertisement blocks 50. Each advertisement block 50 may include one or more advertisements such as advertiser-related images, videos, animations, text links, or other advertisements.

Advertisements may sometimes be referred to as advertiser creatives or simply as creatives. For example, an advertiser creative may include a jpeg image of a product and an embedded clickable link to a web site that sells that product. System 10 may be used to identify advertisement blocks 50, to identify advertisers that advertise in those advertisement blocks, to record individual advertiser creatives or text links displayed in those advertisement blocks, and to identify advertising channels that placed those advertiser creatives or text links in those advertisement blocks. System 10 may be used to compile, analyze and display advertisement data associated with advertisements, advertisers, advertising channels and publishers to a customer.

Figure 4:
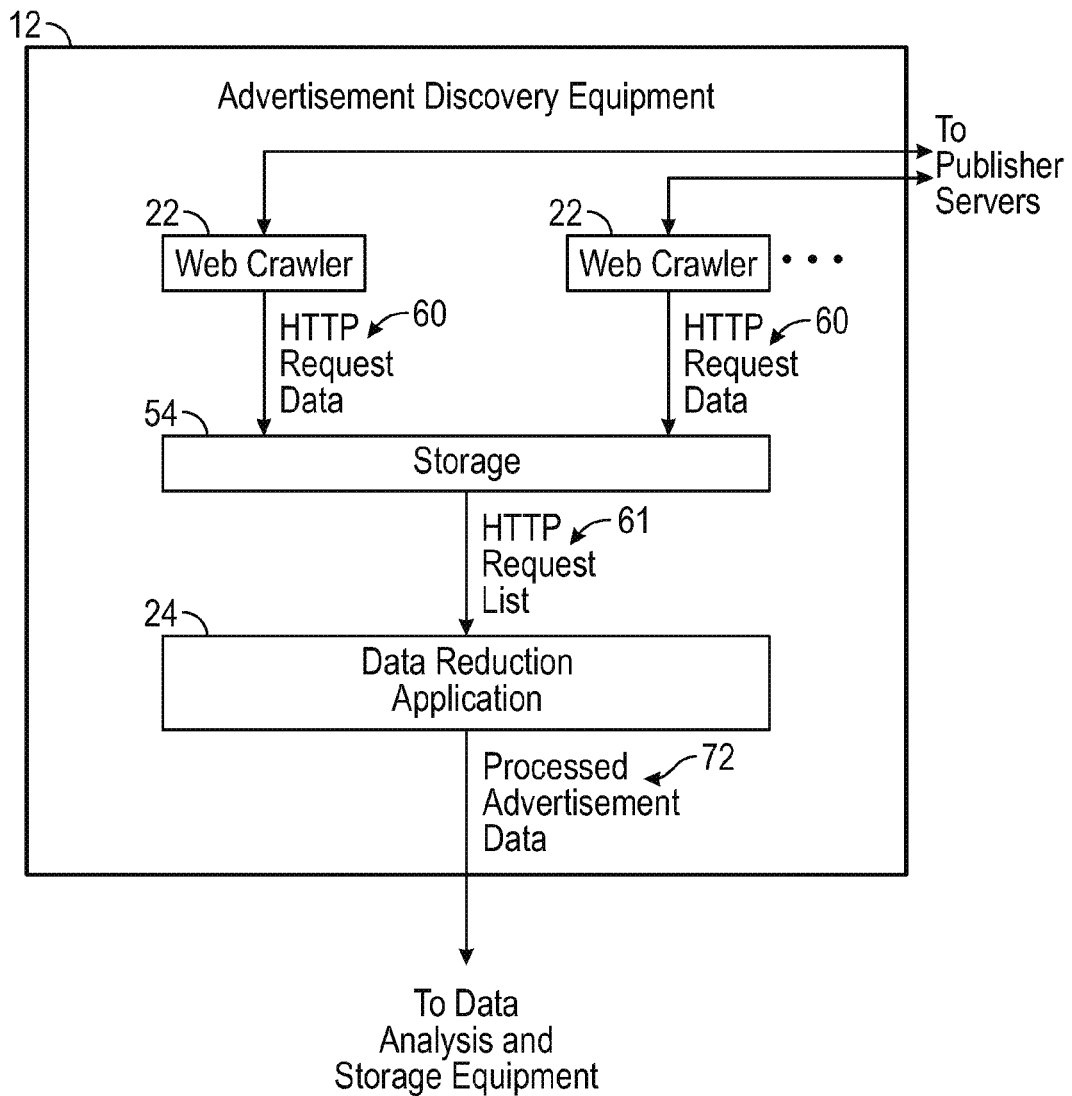
FIG. 4 is an illustrative diagram showing how advertisement discovery equipment may gather, store, and process hypertext transfer protocol request data in accordance with an embodiment of the present invention.

FIG. 4 is an illustrative diagram showing how advertisement discovery equipment 12 may use web crawlers 22 to load a given publisher website and gather HTTP request data 60 associated with each HTTP request that is made while loading that publisher website. Each web crawler 22 may provide gathered HTTP request data 60 to storage such as storage 54 (e.g., one or more hard drives, one or more solid state drives, etc.). HTTP request data may be stored using storage 54 as HTTP request list 61 (e.g., a list of data blocks associated with each HTTP request).

Data reduction application 24 may process HTTP request list 61 to form processed advertisement data 72 that includes information associated with advertisements and advertising channels associated with those advertisements from each visited publisher website. Processed advertisement data 72 may be provided to data analysis and storage equipment such as data analysis and storage equipment 17.

Figure 5:
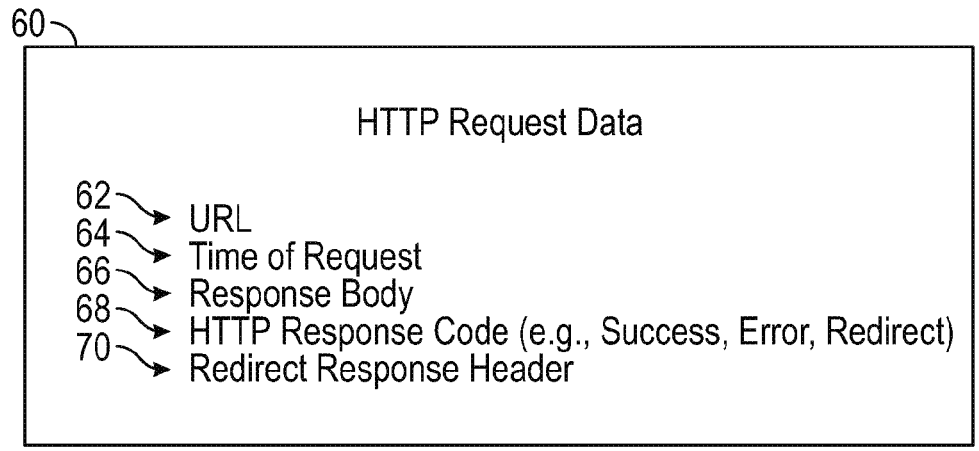
FIG. 5 is a diagram of illustrative hypertext transfer protocol request data in accordance with an embodiment of the present invention.

As shown in FIG. 5, HTTP request data 60 may include information associated with each HTTP request such as URL 62 of the request, time 64 of the request, response body 66 of the response to the request (e.g., the HTML, Javascript code or other code of the page associated with the request), HTTP response code 68 of the response to the request (e.g., a success, failure, or redirect response), and redirect response header 70 (e.g., a web page or other resource that a browser is redirected to in the case of a redirect response code).

Advertisement discovery equipment 12 may use time 64, response body 66, and/or redirect response header 70 of multiple requests to determine the pathway by which a given advertisement has been placed on a publisher web page.

For example, URL 62 of a particular HTTP request associated with an advertisement may be the URL of an advertisement creative (e.g., an image, an animation, a video, etc.). Advertisement discovery equipment 12 may identify an advertisement request time associated with that HTTP request. Advertisement discovery equipment 12 may search HTTP request data 60 associated with other HTTP requests having earlier associated times 64 than time 64 of the particular HTTP request with the advertisement. For example, advertisement discovery equipment 12 may search the previous requests for redirect response headers 60 and/or response bodies 66 that include references to URL 62 of the particular HTTP request associated with the advertisement. In this way, a cause and effect relationship between HTTP requests may be determined and used to identify the pathway by which a given advertisement has been placed on a publisher web page.

Advertising discovery equipment 12 may generate processed advertisement data 72 that represents, for each publisher website, the identified advertisements on that website and the identified pathways by which the identified advertisements were placed on that website. If desired, processed advertisement data 72 may include additional information related to content on a publisher website that represents, for each publisher website, other identified content on that website and identified pathways by which the other identified content was placed on that website.

Figure 6:
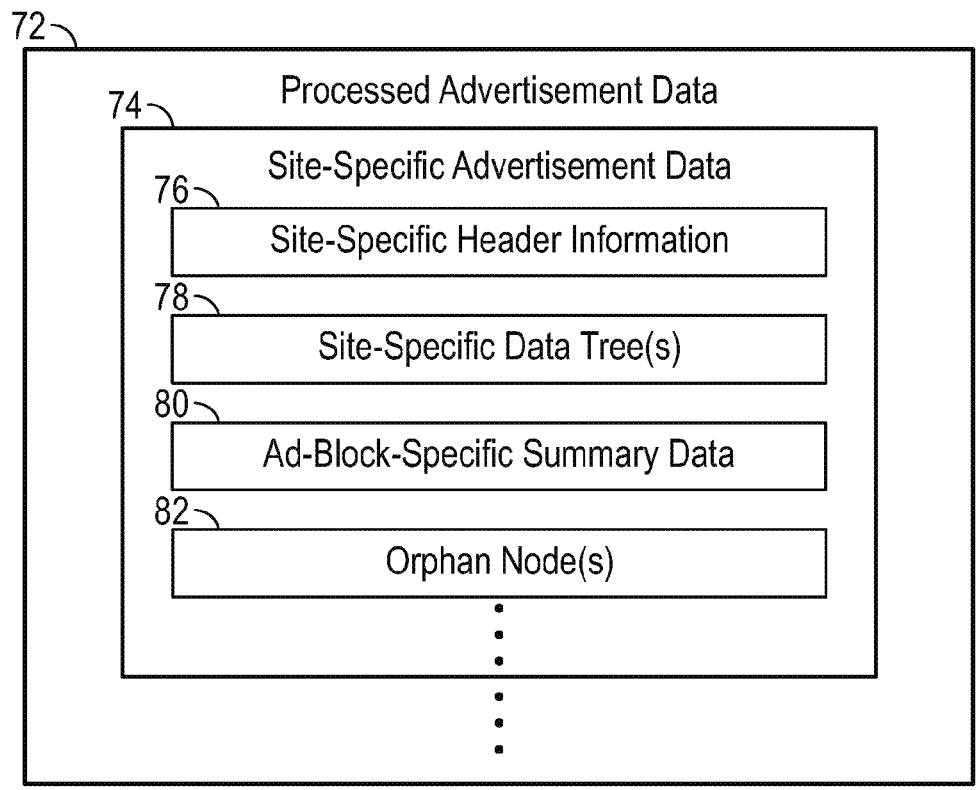
FIG. 6 is a diagram of illustrative processed advertisement data in accordance with an embodiment of the present invention.

As shown in FIG. 6, processed advertisement data 72 may be arranged in grouped blocks of advertisement data such as one or more blocks of website-specific advertisement data 74. Site-specific advertisement data 74 may include site-specific header information 76, one or more site-specific data trees 78, and ad-block-specific summary data 80 associated with each advertisement block on a given website.

In some situations, advertising discovery equipment 12 may discover content on a publisher webpage with an unidentified pathway of placement. In this type of situation, advertising discovery equipment 12 may include information such as an orphan node 82 in site-specific advertisement data 74 that identifies the discovered content without an associated pathway of placement. Site-specific advertisement data 74 may include website-specific advertisement data 74 for one, two, three, more than three, more than 10, more than 100, more than 1000, hundreds of thousands or more publisher websites.

Figure 7:
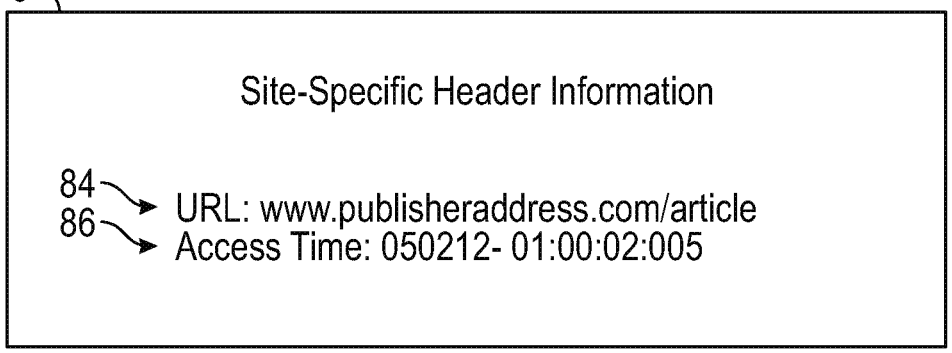
FIG. 7 is a diagram of illustrative publisher site-specific header information in accordance with an embodiment of the present invention.

As shown in FIG. 7, site-specific header information 76 may include URL 84 of the website and access time 86 that the website was explored. In the example of FIG. 7, URL 84 includes a publisher URL "www.publisheraddress.com/article" for a given article and access time 86 includes a date (May 2, 2012 represented by the numerical string 050212) and clock time (01:00:02:0005 indicating the hour, minute, second, and millisecond that the website was accessed). However this is merely illustrative. URL 84 may include a URL associated with any website or resource and access time 86 may be represented by any suitable string that indicates any access time to any suitable degree of accuracy.

Figure 8:
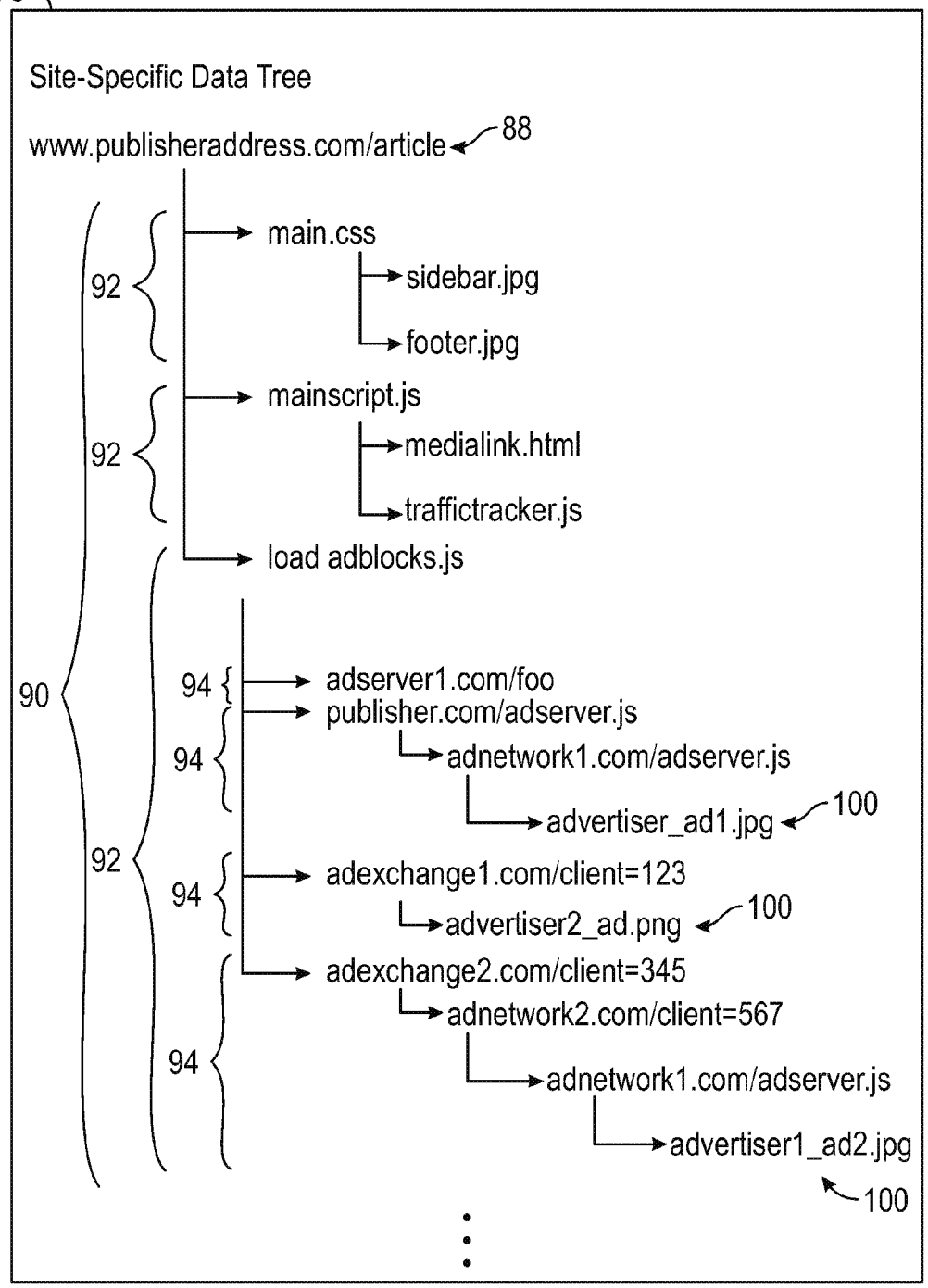
FIG. 8 is a diagram of an illustrative publisher site-specific data tree in accordance with an embodiment of the present invention.

As shown in FIG. 8, identified pathways for identified content on a publisher website may be represented by a site-specific data tree 78 that includes a base 90 with branches 92, sub-branches 94, etc. that indicate pathways of placement for the content in each branch, sub-branch, etc.

In the example of FIG. 8, publisher website 88 (e.g., a web page located at a URL of www.publisheraddress.com/article) includes cascading style sheet (CSS) files, Javascript (JS) files, URLs, and images (e.g., joint photographic experts group (JPEG) and portable network graphics (PNG) files). However, this is merely illustrative. Tree 78 may include branches and sub-branches with data associated with any suitable website content.

As shown in FIG. 8, site-specific data tree 78 may include URL 88 of the associated base publisher website, branches 92 associated with publisher content and branches 92 associated with advertisement content.

Branches 92 associated with publisher content may include a main style sheet (e.g., main.css) that links to images with filenames such as sidebar.jpg and footer.jpg and a main script for instructing a web browser how to display the website (e.g., mainscript.js). The main script may link to non-advertisement content such as a social media link (MEDIALINK.HTML) or a user traffic monitor script (TRAFFICTRACKER.JS).

Branches 92 associated with advertisement content may include a branch associated with a main advertisement block loading script (e.g., loadadblocks.js) that loads sub-branches 94 associated with advertisements from various advertising channels. In the example of FIG. 8, tree 78 includes a sub-branch 94 associated with text-based advertisement links placed by a paid advertisement server (e.g., adserver1.com/foo), a sub-branch 94 associated with placement of a creative 100 (e.g., advertiser1_ad1.jpg) by an advertising network (e.g., adnetwork1.com/adserver.js) that has purchased advertising space from the publisher (e.g., publisher.com/adserver.js), a sub-branch 94 associated with a creative (e.g., advertiser2 as.png) that was placed by an advertising exchange company (e.g., adexchange1.com/client=123), a sub-branch 94 associated with a creative 100 (e.g., advertiser1_ad2.jpg) placed by an ad network (e.g., adnetwork.com/adserver.js) that has purchased ad space from another advertising network (e.g., adnetwork2.com/client=567) that has purchased ad space from an advertising exchange company (e.g., adexchange2.com/client=123). The branches and sub-branches of FIG. 8 are merely illustrative. System 10 may be used to generate data trees having any number of bases, any number of branches, any number of sub-branches or any number of layers of branches to suitably represent identified content and identified pathways of placement for identified content on a given web page.

Relationships between sub-branches 94, branches 92, sub-sub-branches, etc. that are represented by a data tree such as data tree 78 may be determined by advertisement discovery equipment 12 by determining cause and effect relationships between HTTP requests made while loading a publisher webpage as described above in connection with, for example, FIGS. 4 and 5.

Figure 9:
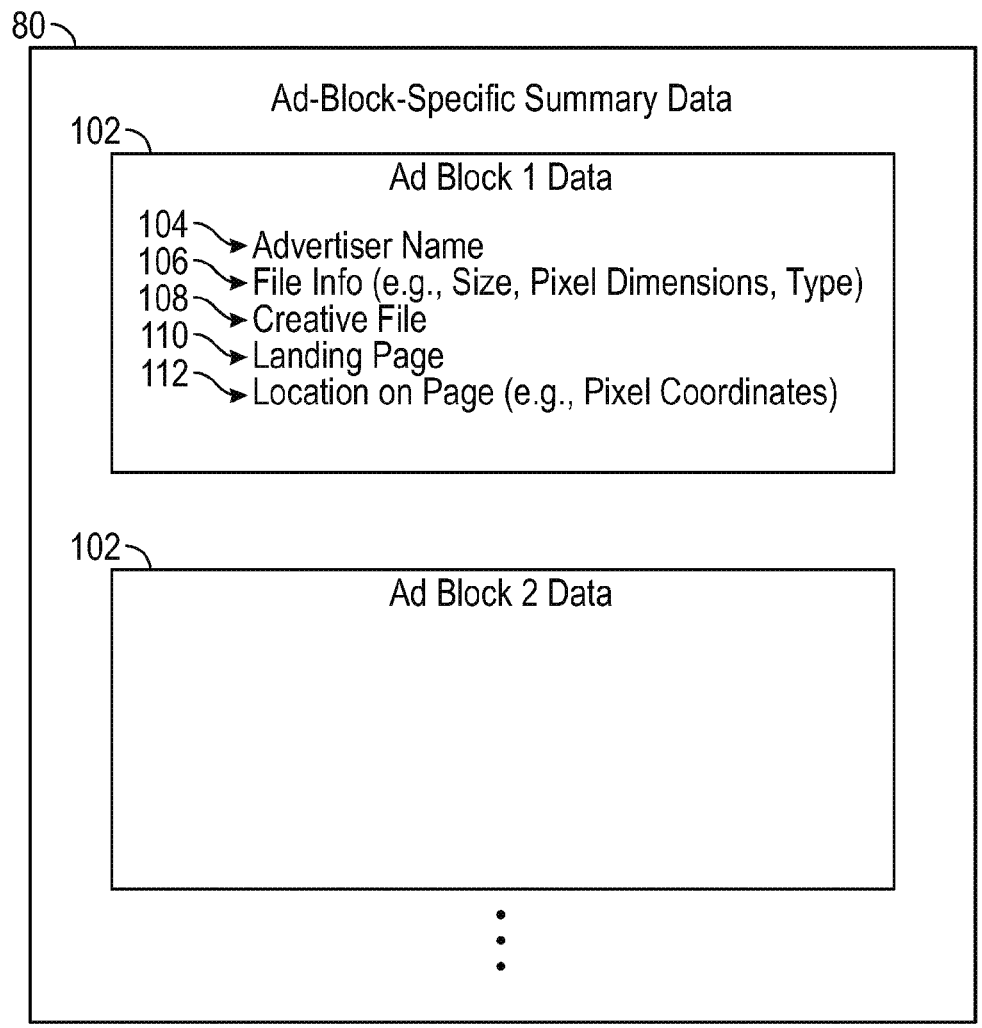
FIG. 9 is a diagram of illustrative advertisement-block-specific summary data in accordance with an embodiment of the present invention.

As shown in FIG. 9, ad-block-specific summary data 80 of site-specific advertisement data 74 (FIG. 6) may include advertisement block data 102 for each advertisement on a publisher website. Advertisement block data 102 for each advertisement block may include advertiser name 104, file information 106 (e.g., the file size, pixel dimensions or file type of a given creative), creative files 108 (e.g., a copy a creative image, video, animation file itself), landing pages 110 (e.g., an advertiser webpage URL or URL of a webpage that sells the products being advertised), and page location 112 (e.g., the pixel coordinates at which creatives 108 are displayed).

If desired, some or all of site-specific advertisement data 74 may be mapped to a customer-friendly name such as a name of an advertising company using a predetermined set of name-mapping rules. For example, an advertiser associated with a website with a URL of www.advertiser1.com may be associated with a customer-friendly name of ADVERTISER1.

If desired, each HTTP request may be mapped to a customer-friendly name corresponding to an associated service.

Figure 10:
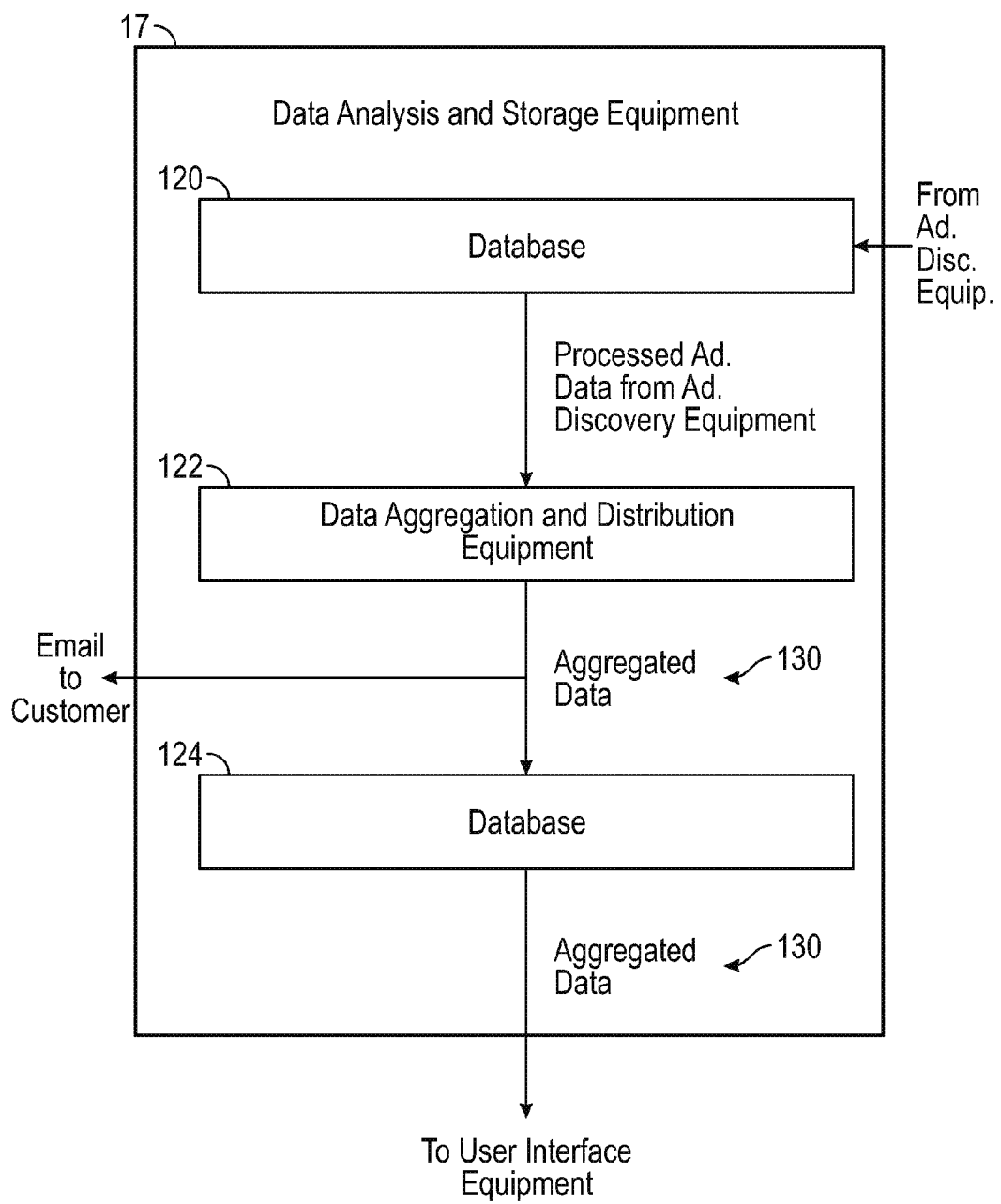
FIG. 10 is an illustrative diagram showing how data analysis and storage equipment may receive, store, and combine processed advertisement data in accordance with an embodiment of the present invention.

Processed advertisement data 72 from one or more implementations of advertisement discovery equipment 12 may be provided to data analysis and storage equipment 17. As shown in FIG. 10, processed advertisement data 72 may be stored using a first database such as database 120. Database 120 may be a local hard drive, a solid state drive, or another type of local storage medium or may be remote storage such as additional cloud-based storage.

Computing equipment such as data aggregation and distribution equipment 122 may periodically obtain the processed advertisement data from database 120 and combine processed advertisement data from multiple time-separated explorations of a publisher website or from multiple identifications of a given advertiser (or a given advertisement creative) across multiple publisher websites to form aggregated data 130.

Aggregated data 130 may be provided to a database 124. User interface equipment such as user interface equipment 18 (see, e.g., FIG. 1) may be used to provide customer access to the aggregated data stored in database 124. Database 124 may be a local hard drive, a solid state drive, or another type of local storage medium or may be remote storage such as additional cloud-based storage. If desired, data aggregation and distribution equipment 122 may be used to email some or all of aggregated data 130 to a chosen customer.

Some or all of aggregated data 130 may be emailed to a chosen customer periodically (e.g., weekly, monthly, or yearly) or may be emailed to a customer when a predetermined change in the aggregated data is detected by aggregation and distribution equipment 122. For example, if placements of a particular advertisement creative rise above (or fall below) a predetermined threshold, aggregation and distribution equipment 122 may generate and send an email to a customer alerting them to that change.

Figure 11:
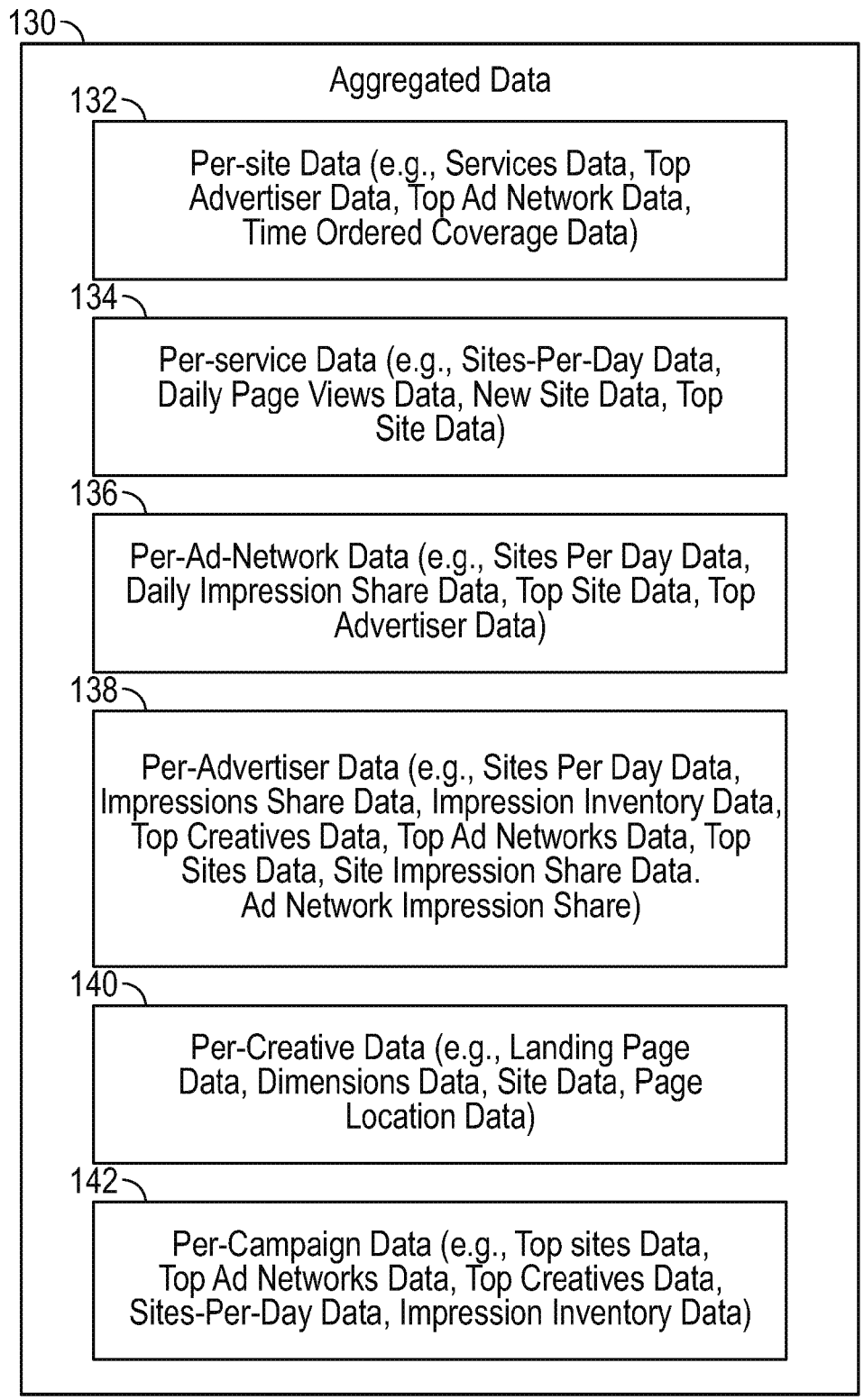
FIG. 11 is a diagram of illustrative aggregated advertisement data that has been combined using the data analysis and storage equipment in accordance with an embodiment of the present invention

As shown in FIG. 11, aggregated data 130 may include data that has been sorted and combined based upon various criteria. As examples, aggregated data 130 may include per-site data 132, per-service data 134, per-ad-network data 136, per-advertiser data 138, per-creative data 140 and/or per-campaign data 142. Per-site data 132 may include processed and aggregated advertisement data that has been sorted and combined by publisher website. For example, per-site data 132 for a given publisher website may include data indicating which advertisers, ad campaigns, ad creatives, advertising networks, advertising exchanges, etc. have been associated with that given publisher website during a given time period.

Per-site data 132 may include data such as services data associated with services linked to the site, top advertiser data related to advertisers that are most often placed on the site, top ad network data related to ad networks that are most often placed advertisements on the site and/or time-ordered coverage data such as a graph of a percentage of advertisements provided by a given channel versus time.

Per-service data 134 may include processed and aggregated advertisement data that has been sorted and combined by advertising service. Per-service data 134 may include data such as sites-per-day data related to the number of publisher websites on which the service placed ads, daily page views data related to the number of daily views of advertisements placed by a given service, new site data related to the number of new websites on which the service placed ads or top site data related to which websites most often accept ads from the service.

Per-ad-network data 136 may include processed and aggregated advertisement data that has been sorted and combined by advertising network. Per-ad-network data 136 may include data such as sites-per-day data related to the number of publisher websites on which the network placed ads, daily impression share data related to the fraction of impressions placed by a given network, top site data related to which websites most often accept ads from the network or top advertiser data related to advertisers most often placed by the network.

Per-advertiser data 138 may include processed and aggregated advertisement data that has been sorted and combined by advertiser. Per-advertiser data 138 may include data such as sites-per-day data related to the number of publisher websites on which the advertiser is represented, daily impression share data related to the fraction of impressions related to the advertiser, impression inventory data related to the channels that most often place advertisements for the advertiser, top creatives data related to the creatives most often placed on publisher websites, top ad networks data related to the ad networks that most often place advertisements for the advertiser, top site data related to which websites most often display ads from the advertiser, site impression share data related to the fraction of impressions on each publisher for the advertiser or ad network impression share data related to the fraction of impressions from each ad network for the advertiser.

Per-creative data 140 may include processed and aggregated advertisement data that has been sorted and combined by advertising creative. Per-creative data 140 may include data such as landing page data related to the landing page associated with a creative, dimensions data related to the displayed size of each creative, site data related to publisher websites from which each creative was obtained or page location data related to the location on the publisher web page on which the creative was displayed.

Per-campaign data 142 may include processed and aggregated advertisement data that has been grouped by advertising campaign. An advertising campaign may include multiple advertisement creatives for a portion of an advertiser's products (e.g., a campaign for trucks made by an automaker). Per-campaign data 142 may include data such as top site data related to which websites most often display ads from the campaign, top ad networks data related to the ad networks that most often place advertisements from the campaign, top creatives data related to the creatives most often placed from the campaign, sites-per-day data related to the number of publisher websites on which the creatives for the campaign were placed or impression inventory data related to the fraction of impressions from each ad network for the campaign.

Figure 12:
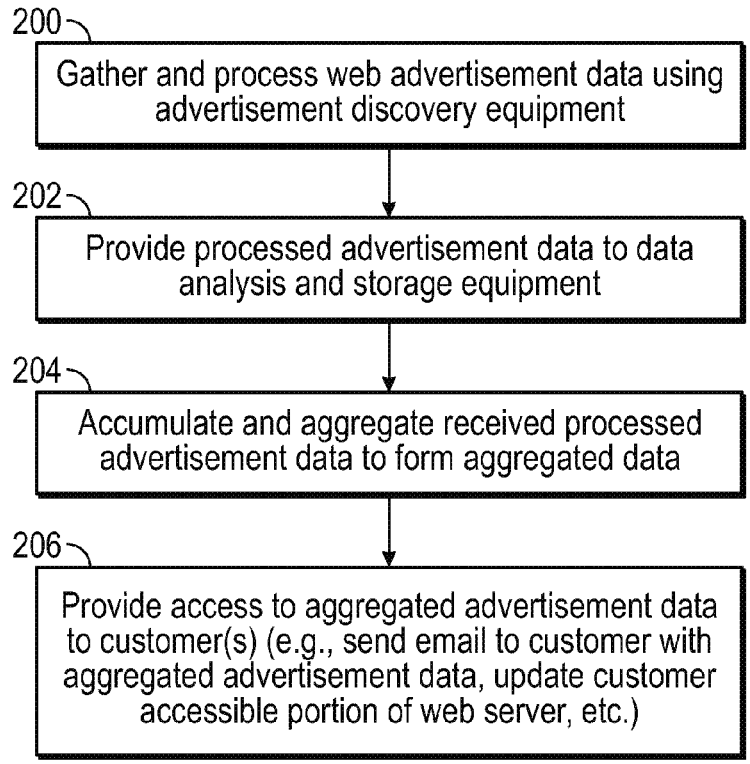
FIG. 12 is a flow chart of illustrative steps that may be used in discovering advertisements and determining pathways by which advertisements have been placed on publisher websites in accordance with an embodiment of the present invention.

Illustrative steps that may be involved in discovering advertisements and determining pathways by which advertisements have been placed on publisher websites are shown in FIG. 12.

At step 200, advertisement data such as web-based advertisement data may be gathered and processed using, for example, advertising discovery equipment 12 of FIG. 1.

At step 202, processed advertisement data such as processed advertisement data 72 (see, e.g., FIG. 5) may be provided from advertising discovery equipment 12 to, for example, data analysis and storage equipment 17.

At step 204, the data analysis and storage equipment may be used to accumulate and aggregate the received processed advertisement data to form aggregated data such as aggregated advertisement data 130 (see, e.g., FIG. 11).

At step 206, computing equipment such as user interface equipment 18 (FIG. 1) may be used to provide access to the aggregated advertisement data (e.g., by sending an email to a customer with some or all of the aggregated advertisement data, updating a customer-accessible portion of a web server, etc.)

Figure 13:
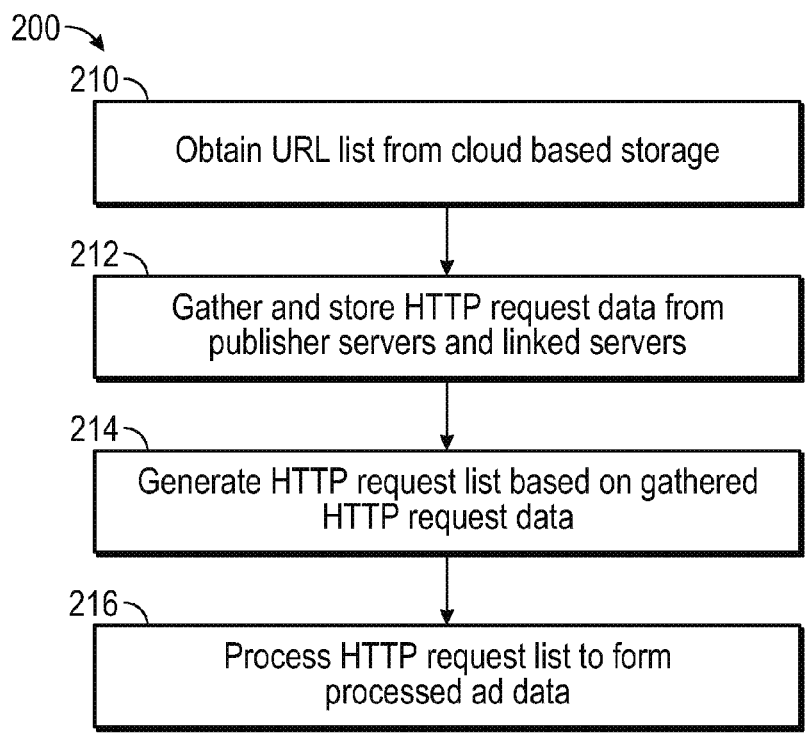
FIG. 13 is a flow chart of illustrative steps that may be used in gathering and processing web advertisement data in accordance with an embodiment of the present invention.

Illustrative steps that may be involved in gathering and processing web advertisement data as described above in connection with step 200 of FIG. 12 are shown in FIG. 13.

At step 210, advertisement discovery equipment 12 may obtain a list of URLs of publisher websites to be explored. The URL list may be obtained, for example, from remote storage such as cloud-based storage 14. However, if desired, some or all of the URL list may be generated by advertisement discovery equipment 12 as described above in connection with FIG. 2.

At step 212, HTTP request data such as HTTP request data 60 (see, e.g., FIG. 5) may be gathered and stored from publisher servers and linked servers associated with the URLs in the obtained URL list and URLs obtained while spidering the websites associated with the obtained URL list.

At step 214, advertisement discovery equipment 12 may generate a list 61 of HTTP requests based on the gathered HTTP request data.

At step 216, the HTTP request list may be processed using advertisement discovery equipment 12 to form processed advertisement data 72.

Figure 14:
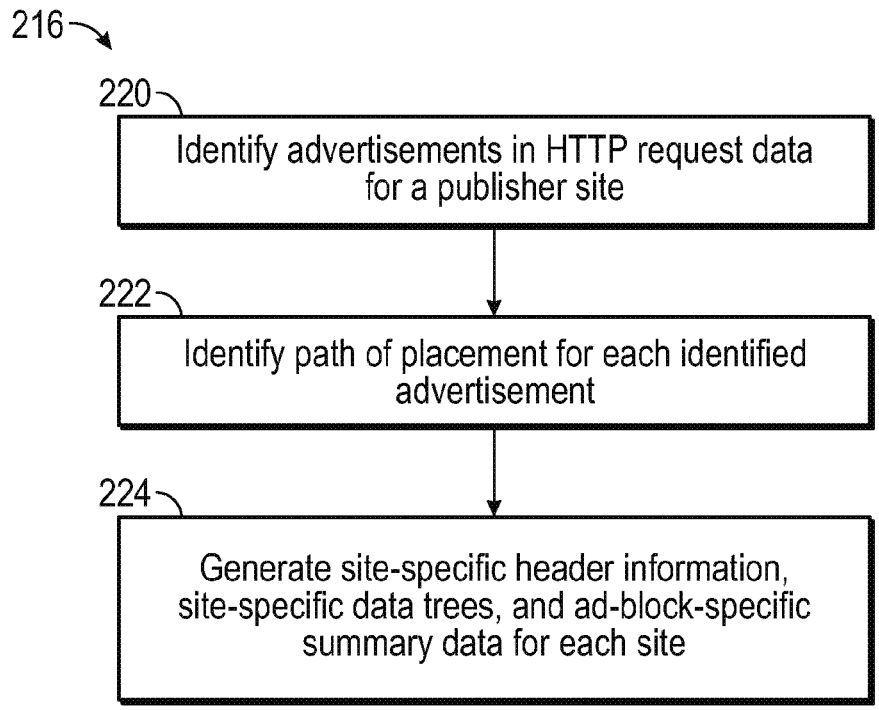
FIG. 14 is a flow chart of illustrative steps that may be used in processing data to form processed advertisement data in accordance with an embodiment of the present invention.

Illustrative steps that may be involved in processing the HTTP request list to form processed advertisement data 72 as described above in connection with step 216 of FIG. 13 are shown in FIG. 14.

At step 220, computing equipment such as computing equipment associated with advertisement discovery equipment 12 may identify advertisements such as advertisement creatives in HTTP request data 60 associated with a publisher website.

At step 222, computing equipment such as computing equipment associated with advertisement discovery equipment 12 may identify placement pathways for each identified advertisement.

At step 224, computing equipment such as computing equipment associated with advertisement discovery equipment 12 may be used to generate site-specific header information, one or more site-specific data trees, and ad-block-specific summary data for each publisher website in the URL list.

Figure 15:
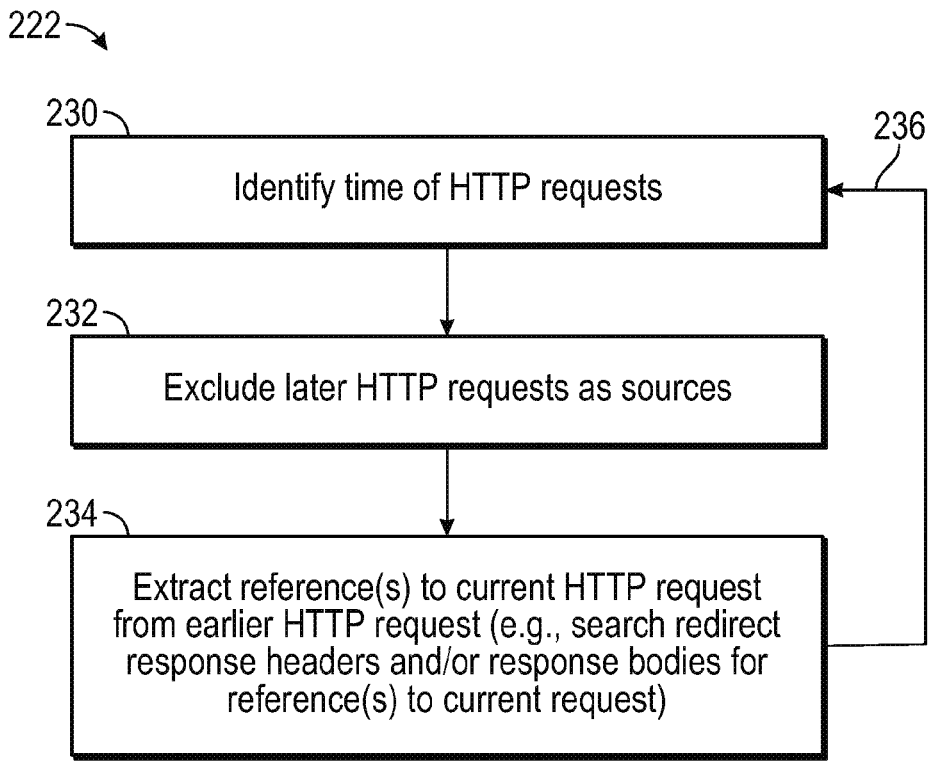
FIG. 15 is a flow chart of illustrative steps that may be used in identifying a placement pathway for an identified advertisement in accordance with an embodiment of the present invention.

Illustrative steps that may be involved in identifying placement pathways of advertisements on publisher websites as described above in connection with step 222 of FIG. 14 are shown in FIG. 15.

At step 230, computing equipment such as computing equipment associated with advertisement discovery equipment 12 may be used to identify the time at which each HTTP request was made.

At step 230, computing equipment such as computing equipment associated with advertisement discovery equipment 12 may be used to exclude later HTTP requests as possible sources of earlier HTTP requests.

At step 232, computing equipment such as computing equipment associated with advertisement discovery equipment 12 may be used to extract one or more references to a current HTTP request (e.g., references to a URL associated with the current HTTP request) from HTTP request data associated with earlier HTTP requests. Extracting references to a current HTTP request from earlier HTTP request data may include searching redirect response headers and/or response bodies in HTTP request data associated with earlier HTTP requests for references to the current HTTP request.

As indicated by arrow 236, steps 230, 232, and 234 may be repeated until a full placement pathway has been identified for a given identified advertisement.

Figure 16:
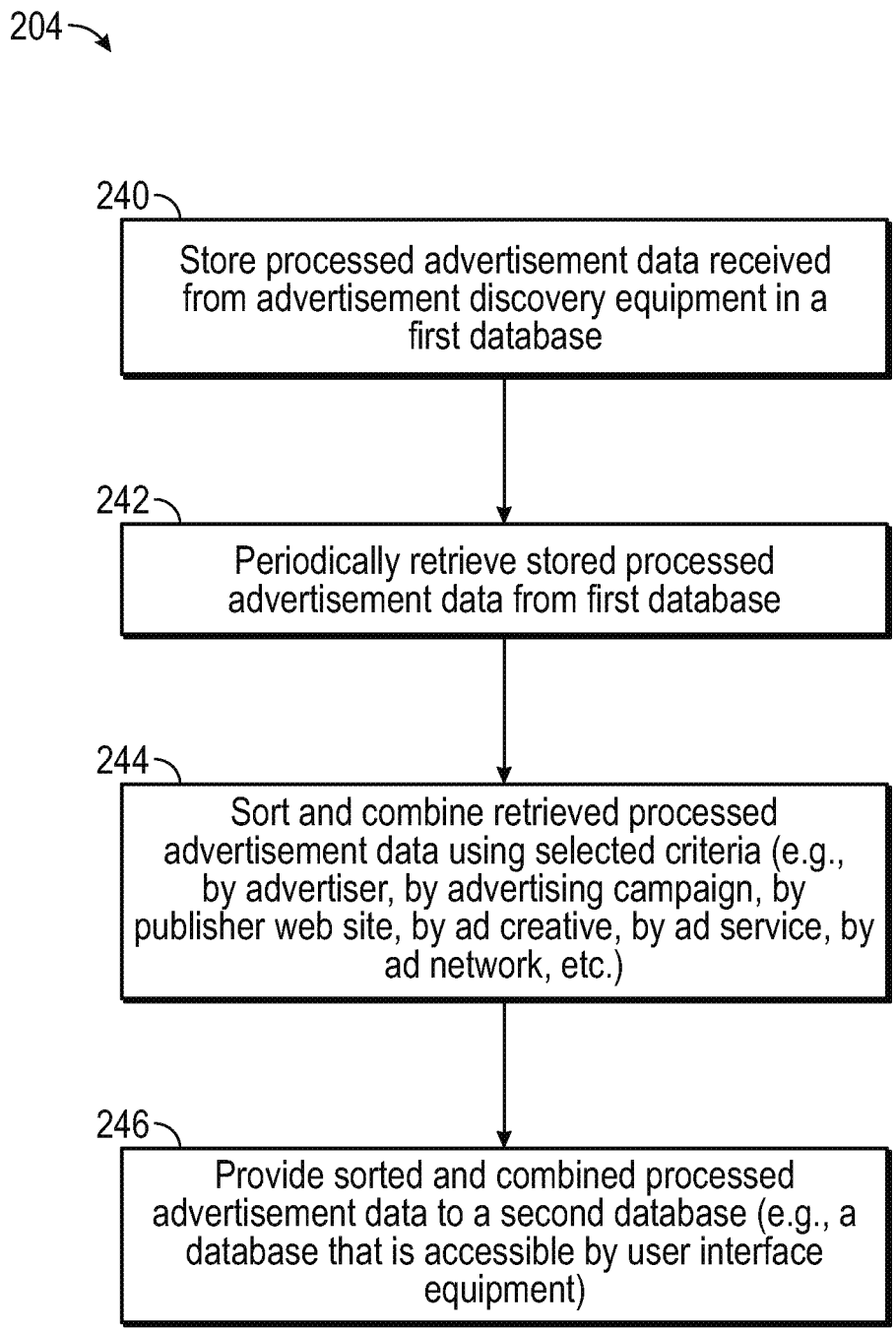
FIG. 16 is a flow chart of illustrative steps that may be used in accumulating and aggregating processed advertisement data in accordance with an embodiment of the present invention.

Illustrative steps that may be involved in accumulating and aggregating processed advertisement data as described above in connection with step 204 of FIG. 12 are shown in FIG. 16.

At step 240, the processed advertisement data received from advertisement discovery equipment 12 may be stored in a first database.

At step 242, the stored processed advertisement data may be periodically obtained from the first database by computing equipment such as data aggregation and distribution equipment 122.

At step 244, the retrieved processed advertisement data may be sorted and combined using selected criteria. As examples, the selected criteria may include an advertiser, an advertising campaign, a publisher website, an ad creative, an ad service, an ad network, etc. The data that has been sorted and combined using these criteria may be used to form aggregated data 130 (see, e.g., FIG. 11).

At step 246, the sorted and combined processed advertisement data may be provided to a second database (e.g., a database that is accessible by user interface equipment such as user interface equipment 18.

Figure 17:
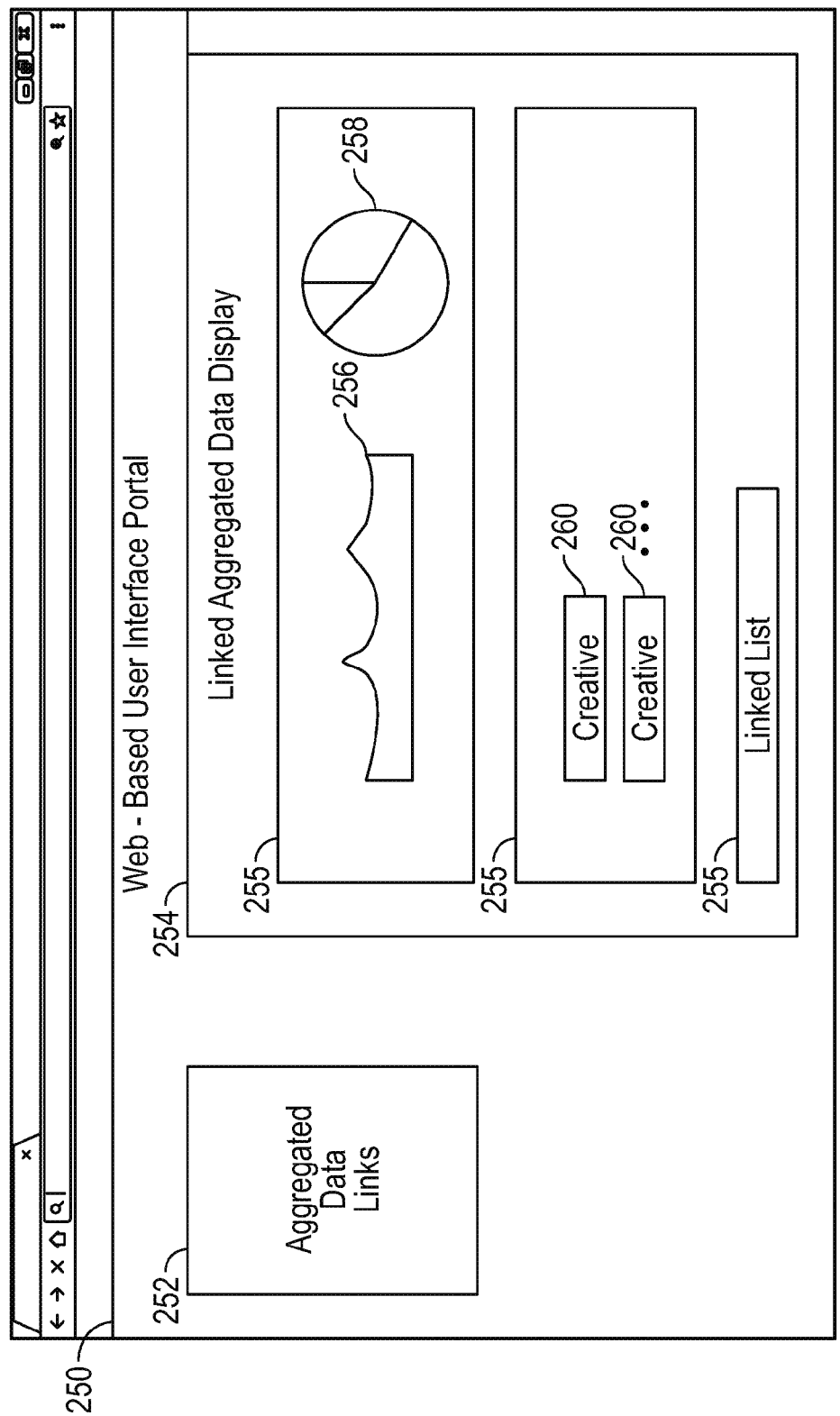
FIG. 17 is a diagram of an illustrative web-based user interface portal for providing aggregated advertisement data to a customer in accordance with an embodiment of the present invention.

FIG. 17 is a diagram of an illustrative web-based user interface portal that may be used to provide aggregated data 130 to a customer as described above in connection with, for example, step 206 of FIG. 12. Web-based user interface portal 250 may, for example, be a web site that is accessible to a customer following authentication with a customer user name and password.

As shown in FIG. 17, web-based user interface portal 250 may include a set of links 252 to aggregated data such as aggregated data 130. Following links in aggregated data links 252 may provide a customer with lists such as lists 255, graphs such as graph 256, charts such as chart 258, advertising creatives 260, and/or other links, summaries or displays associated with aggregated data 130. Each link in aggregated data links 252 may link a customer to a linked aggregated data display 254 that has been sorted according to a chosen criteria associated with that link. For example, clicking a first link may result in a display of lists, graphs, and additional links for exploring per-site data 132 and clicking a second link may result a display of lists, graphs, and additional links for exploring per-advertiser data 138.

Figure 18:
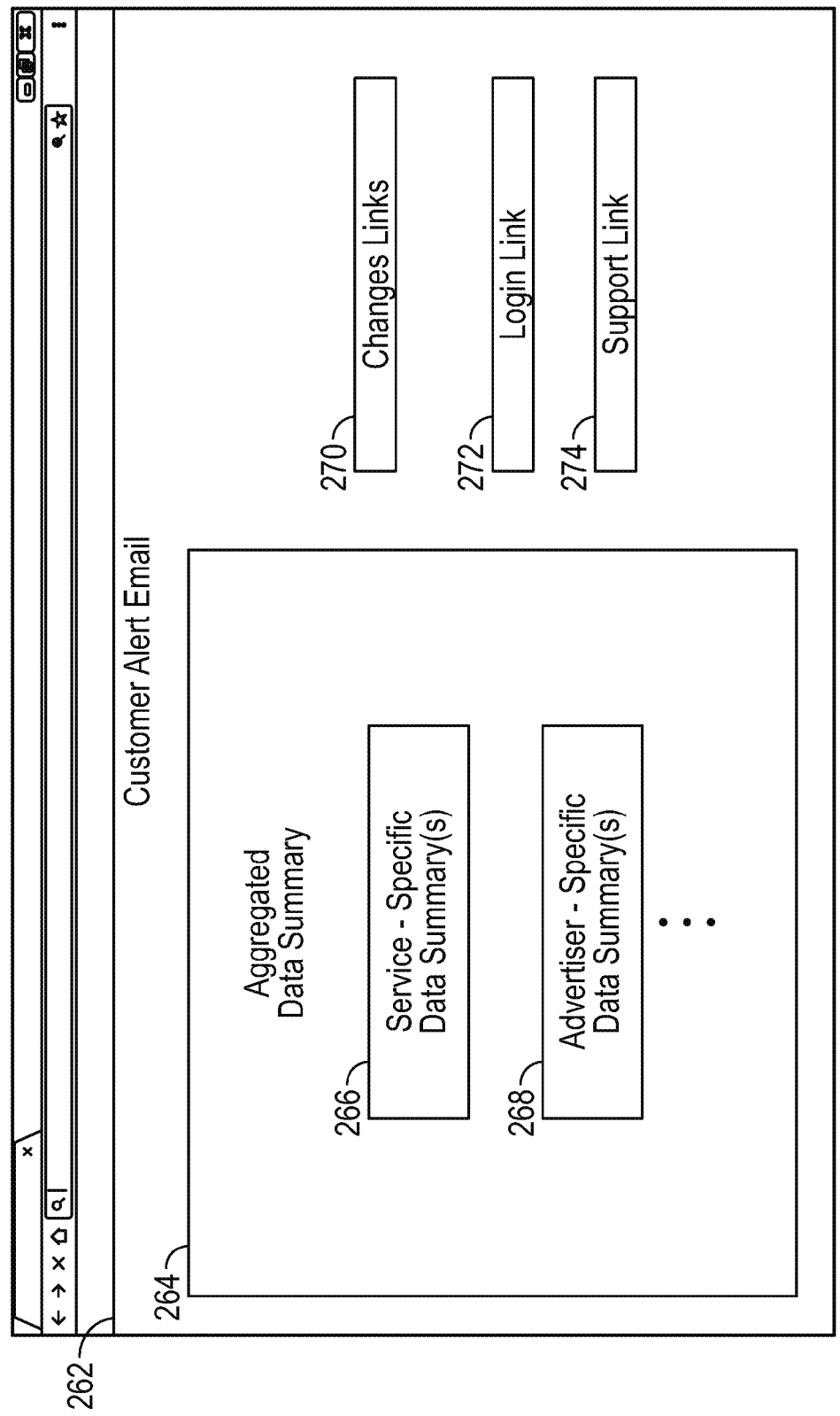
FIG. 18 is a diagram of an illustrative customer alert email for providing aggregated advertisement data to a customer in accordance with an embodiment of the present invention.

If desired, in addition to or instead of providing access to a website such as web-based user interface portal 250 of FIG. 17, a customer may be provided with access to aggregated data 130 by sending the customer an alert email such as customer alert email 262 of FIG. 18. As shown in FIG. 18, email 262 may include a summary 264 of aggregated data 130. Summary 264 may include service-specific data summary 266, advertiser-specific data summary 268 or any other data summary associated with aggregated data 130. Email 262 may include links such as clickable links for obtaining additional information associated with aggregated data 130 such as links 270 to information associated with changes in aggregated data 130 with respect to a previous time period (e.g., the previous week), a login link 272 for directing the customer to a website such as web portal 250 of FIG. 17, and a support link such as support link 274 for directing the customer to help services for using or understanding system 10 and/or aggregated data 130.

Emails such as email 262 may be generated and sent to a customer periodically (e.g., daily, weekly or monthly) or in response to an identified change in advertising methods, channels or trends that may be of interest to the customer.

The examples of FIGS. 17 and 18 are merely illustrative. If desired, customers may be provided with access to aggregated data 130 through an API, through bulk file transfer, through printed paper reports or any other suitable medium for transmitting information.

The foregoing is merely illustrative of the principles of this invention and various modifications can be made by those skilled in the art without departing from the scope and spirit of the invention.

What is claimed is:

1. A method, comprising:
   with a web crawler, loading a publisher web page associated with a universal resource locator by sending a request to the universal resource locator;
   with the web crawler, loading each linked website or resource included in the publisher web page by sending additional requests to additional universal resource locators associated with each linked website or resource;
   storing, for the request and each additional request, request data that includes a response body and a request time;
   with the web crawler, identifying advertisements that are displayed on the publisher web page that has been loaded based on the stored response bodies; and
   with the web crawler, identifying, based on at least some of the stored request times, a placement pathway by which at least one of the identified advertisements was placed on the publisher web page,
   wherein the identifying comprises:
      identifying, in the stored request times, an advertisement request time associated with the at least one of the identified advertisements,
      identifying a subset of the additional requests that have associated request times that are earlier than the advertisement request time,
      extracting a reference to the at least one of the identified advertisements from a portion of the stored request data that corresponds to the identified subset of the additional requests that have associated request times that are earlier than the advertisement request time, and
      identifying the placement pathway based on the extracted reference.

2. The method defined in claim 1 wherein identifying the placement pathway for the at least one of the identified advertisements comprises:
   determining a source that placed the at least one identified advertisement on the publisher web page.

3. The method defined in claim 2 wherein loading the publisher web page associated with the universal resource locator comprises:
   sending the request to a publisher server associated with the universal resource locator;

receiving a response from the publisher server; and
sending the additional requests based on the received response from the publisher server.

4. The method defined in claim 1 further comprising:
with the web crawler, obtaining a list of universal resource locators corresponding to publisher web pages to be loaded.

5. The method defined in claim 1, wherein identifying the placement pathway further comprises:
determining a cause and effect relationship between at least some of the additional requests based on the stored request times.

6. The method defined in claim 5, wherein identifying the placement pathway further comprises:
identifying an advertising channel that placed the at least one of the identified advertisements on the publisher web page that has been loaded.

7. The method defined in claim 1, further comprising:
with the web crawler, identifying an advertisement block displayed on the publisher web page that has been loaded; and
with data processing and storage equipment, storing ad block data for the identified advertisement block.

8. The method defined in claim 7, further comprising:
with the web crawler, identifying an advertiser that advertises in the identified advertisement block, wherein the ad block data includes a name of the advertiser.

9. The method defined in claim 7, further comprising:
with the web crawler, identifying an advertiser creative associated with the identified advertiser that is displayed in the identified advertisement block, wherein the ad block data includes a file including the creative.

10. The method defined in claim 9, wherein identifying the placement pathway further comprises:
with the web crawler, identifying an advertising channel that placed the identified advertiser creative in the identified advertisement block, wherein the advertising channel is different from the advertiser.

11. The method defined in claim 10, wherein identifying the advertising channel that placed the identified advertiser creative in the identified advertisement block comprises identifying an advertising exchange that placed the identified advertiser creative in the identified advertisement block.

12. The method defined in claim 1, wherein the web crawler is coupled to data analysis and storage equipment, the method further comprising:
storing the identified placement pathway in a database;
with the data analysis and storage equipment, retrieving the identified placement pathway from the database; and
with the data analysis and storage equipment, generating aggregated advertisement data by aggregating at least the identified placement pathway retrieved from the database with additional advertisement information.

13. The method defined in claim 12, further comprising:
with the data analysis and storage equipment, providing the aggregated advertisement data to user interface equipment; and
with the user interface equipment, displaying the aggregated advertisement data.

14. The method defined in claim 1, further comprising:
with the web crawler, loading an additional publisher web page associated with an additional universal resource locator;
with the web crawler, identifying additional advertisements that are displayed on the additional publisher web page that has been loaded;
with the web crawler, identifying an additional placement pathway for at least one of the identified additional advertisements that are displayed on the additional publisher web page;
with the web crawler, generating a first site-specific data tree based at least on the identified placement pathway for the publisher web page that has been loaded;
with the web crawler, generating a second site-specific data tree based at least on the identified additional placement pathway for the additional publisher web page that has been loaded; and
with processing circuitry that is coupled to the web crawler, extracting data associated with an advertising network from the first and second site-specific data trees that have been generated for the publisher web page and the additional publisher web page that have been loaded.

15. The method defined in claim 1, further comprising:
with the web crawler, gathering data by accessing each of a plurality of publisher web pages, wherein the plurality of publisher web pages includes the publisher web page that has been loaded;
with the web crawler, determining, using the gathered data, which of a plurality of advertising channels has placed a plurality of advertisements on the plurality of publisher web pages, wherein the plurality of advertisements comprises the identified advertisements;
with the web crawler, generating advertisement data using the determination of which of the plurality of advertising channels has placed each of the plurality of advertisements on the plurality of publisher websites, wherein the generated advertisement data comprises the identified placement pathway; and
with the web crawler, providing the advertisement data to data analysis and storage equipment.

16. The method defined in claim 15, further comprising:
with the data analysis and storage equipment, sorting and combining the advertisement data based on a set of criteria to generate aggregated advertisement data; and
with the data analysis and storage equipment, generating a web-based user interface portal that includes a plurality of links to the aggregated advertisement data and a linked aggregated data display corresponding to each of the plurality of links.

\* \* \* \* \*